(12) United States Patent
Jakes et al.

(10) Patent No.: US 11,430,274 B1
(45) Date of Patent: Aug. 30, 2022

(54) UNLOCKING LOCK ON DEVICE BASED ON ULTRA-WIDEBAND LOCATION TRACKING

(71) Applicant: Lenovo (Singapore) Pte. Ltd., Singapore (SG)

(72) Inventors: Philip John Jakes, Durham, NC (US); John Carl Mese, Cary, NC (US)

(73) Assignee: Lenovo (Singapore) Pte. Ltd., Singapore (AF)

( * ) Notice: Subject to any disclaimer, the term of this patent is extended or adjusted under 35 U.S.C. 154(b) by 0 days.

(21) Appl. No.: 17/204,617

(22) Filed: Mar. 17, 2021

(51) Int. Cl.
| | |
|---|---|
| G07C 9/00 | (2020.01) |
| H04W 4/029 | (2018.01) |
| H04W 4/021 | (2018.01) |
| H04B 1/7163 | (2011.01) |
| G07C 9/28 | (2020.01) |

(52) U.S. Cl.
CPC ..... *G07C 9/00309* (2013.01); *G07C 9/00912* (2013.01); *G07C 9/28* (2020.01); *H04B 1/7163* (2013.01); *H04W 4/021* (2013.01); *H04W 4/029* (2018.02); *G07C 2009/00333* (2013.01); *G07C 2209/63* (2013.01); *H04B 2201/71634* (2013.01)

(58) Field of Classification Search
None
See application file for complete search history.

(56) References Cited

U.S. PATENT DOCUMENTS

| | | | |
|---|---|---|---|
| 10,841,174 B1 | 11/2020 | Ely et al. | |
| 2007/0109093 A1* | 5/2007 | Matsubara | G07C 9/00309 340/5.61 |
| 2010/0048172 A1* | 2/2010 | Karaoguz | H04W 4/02 455/411 |
| 2011/0037712 A1 | 2/2011 | Kim et al. | |
| 2014/0253288 A1* | 9/2014 | O'Brien | G07C 9/00309 340/5.61 |
| 2015/0355708 A1* | 12/2015 | Lee | G06F 3/04162 345/173 |
| 2018/0348844 A1 | 12/2018 | Lingutla et al. | |
| 2019/0130175 A1* | 5/2019 | Nakashima | H04M 11/025 |
| 2019/0228601 A1* | 7/2019 | Grzenda | E05B 67/22 |
| 2020/0228943 A1* | 7/2020 | Martin | G01S 5/02 |
| 2020/0314651 A1* | 10/2020 | Pirch | G07C 9/28 |

(Continued)

OTHER PUBLICATIONS

"Building Digital Key Solution for Automotive", CarConnectivity consortium, retrieved from https://carconnectivity.org/wp-content/uploads/CCC-Digital-Key-White-Paper.pdf.

(Continued)

*Primary Examiner* — Carlos Garcia
(74) *Attorney, Agent, or Firm* — John M. Rogitz; John L. Rogitz (57) ABSTRACT

In one aspect, a first device may include at least one processor, an ultra-wideband (UWB) transceiver accessible to the at least one processor, and storage accessible to the at least one processor. The storage may include instructions executable by the at least one processor to track a location of a second device different from the first device using one or more UWB signals received from the second device via the UWB transceiver. The instructions may also be executable to unlock a hardware lock controlled by the first device responsive to a determination, based on the tracking of the location of the second device, that the second device is within a predetermined area of the first device.

20 Claims, 6 Drawing Sheets

(56) References Cited

U.S. PATENT DOCUMENTS

| | | | |
|---|---|---|---|
| 2020/0327753 A1* | 10/2020 | Leiterer | G07C 9/00309 |
| 2021/0082221 A1* | 3/2021 | Zhang | A45C 13/18 |
| 2021/0117521 A1 | 4/2021 | Gorsica et al. | |
| 2021/0158637 A1 | 5/2021 | Kincaid et al. | |
| 2021/0185485 A1* | 6/2021 | Deixler | H04W 64/003 |
| 2021/0306799 A1 | 9/2021 | Kim et al. | |
| 2021/0409896 A1 | 12/2021 | Ahn et al. | |
| 2022/0026920 A1* | 1/2022 | Ebrahimi Afrouzi | |
| | | | G06F 9/5016 |

OTHER PUBLICATIONS

"Car Connectivity Consortium Unveils New Features for Digital Key Specification", Car Connectivity Consortium, Oct. 8, 2019, retrieved from https://carconnectivity.org/press-release/car-connectivity-consortium-unveils-new-features-for-digital-key-specification/.

"Digital Key", Car Connectivity Consortium, 2018, retrieved from https://carconnectivity.org/digital-key/.

"Smart Phone Digital Key", Car Connectivity Consortium, 2018, retrieved from https://carconnectivity.org/wp-content/uploads/CCC-Digital-Key-Brochure.pdf.

"Whitepaper—Digital Key—The Future of Vehicle Access", CarConnectivity Consortium, 2020, retrieved from https://carconnectivity.org/wp-content/uploads/2020/03/CCC_Digital_Key_2.0.pdf.

Jakes et al., "Ultra-Wideband to Identify and Control Other Device", file history of related U.S. Appl. No. 17/204,900, filed Mar. 17, 2021.

Mese et al., "Ultra-Wideband Location Tracking to Perform Voice Input Operation", file history of related U.S. Appl. No. 17/205,265, filed Mar. 18, 2021.

Mese et al., "Ultra-Wideband-Based Device Using Restrictions", file history of related U.S. Appl. No. 17/204,844, filed Mar. 17, 2021.

Mese et al., "Unlocking and/or Awakening Device Based on Ultra-Wideband Location Tracking", file history of related U.S. Appl. No. 17/204,543, filed Mar. 17, 2021.

"FiRa Consortium", Wikipedia, retrieved from https://en.wikipedia.org/wiki/FiRa_Consortium on Feb. 16, 2021.

"Smart Home and Consumer", Fira: The Power to be Precise. Retrieved from https://www.firaconsortium.org/discover/use-cases/smart-home-consumer on Feb. 26, 2021.

"Speech to Text: A Speech service feature that accurately transcribes spoken audio to text", Microsoft Azure, retrieved from https://azure.microsoft.com/en-US/services/cognitive-services/speech-to-text/ on Feb. 26, 2021.

"Ultra-Wideband Technology", Infsoft, retrieved from https://www.ultrawideband.io/en/technology.php on Feb. 16, 2021.

"Ultra-wideband", Wikipedia, retrieved from https://en.wikipedia.org/wiki/Ultra-wideband on Feb. 16, 2021.

Wilhite, Tamara, "An Introduction to UWB Antennas", Turbo Future, Jan. 14, 2021, retrieved from https://turbofuture.com/misc/An-Introduction-to-UWB-Antennas.

Zwirello et al., "UWB Localization System for Indoor Applications: Concept, Realization and Analysis", Hindawi Publishing CorporationJournal of Electrical and Computer Engineering, vol. 2012, May 28, 2012. Retrieved from https://www.hindawi.com/journals/jece/2012/849638/.

Mese et al., "Unlocking and/or Awakening Device Based on Ultra-Wideband Location Tracking", related U.S. Appl. No. 17/204,543, Non-Final Office Action dated Dec. 9, 2021.

Mese et al., "Unlocking and/or Awakening Device Based on Ultra-Wideband Location Tracking",related U.S. Appl. No. 17/204,543, Applicant's response to Non-Final Office Action filed Jan. 6, 2022.

Jakes et al., "Ultra-Wideband to Identify and Control Other Device", related U.S. Appl. No. 17/204,900, Non-Final Office Action dated filed Mar. 11, 2022.

Jakes et al., "Ultra-Wideband to Identify and Control Other Device", related U.S. Appl. No. 17/204,900, Applicant's response to Non-Final Office Action filed May 31, 2022.

* cited by examiner

UNLOCKING LOCK ON DEVICE BASED ON ULTRA-WIDEBAND LOCATION TRACKING

FIELD

The disclosure below relates to technically inventive, non-routine solutions that are necessarily rooted in computer technology and that produce concrete technical improvements. In particular, the disclosure below relates to techniques for unlocking a lock on a device based on ultra-wideband (UWB) location tracking.

BACKGROUND

As recognized herein, manual password entry and other methods for accessing an electronic device pose security risks as those methods are highly susceptible to hacking and data leaks. There are currently no adequate solutions to the foregoing computer-related, technological problem.

SUMMARY

Accordingly, in one aspect a first device includes at least one processor, an ultra-wideband (UWB) transceiver accessible to the at least one processor, and storage accessible to the at least one processor. The storage includes instructions executable by the at least one processor to track a location of a second device different from the first device using one or more UWB signals received from the second device via the UWB transceiver. The instructions are also executable to unlock a hardware lock controlled by the first device responsive to a determination, based on the tracking of the location of the second device, that the second device is within a predetermined area of the first device.

In some examples, the hardware lock may also be unlockable using a physical, metallic key.

The hardware lock may be located on the first device and may be controllable electronically to physically actuate at least one element within the hardware lock to unlock the hardware lock.

Still further, in certain example implementations the predetermined area may be an area in a particular direction relative to the first device. In addition to or in lieu of that, the predetermined area may be an area extending from a particular side of the first device but not all sides of the first device.

Additionally, if desired the instructions may be executable to unlock the hardware lock responsive to a determination, based on the tracking of the location of the second device, that the second device is within the predetermined area of the first device for at least a threshold non-zero amount of time.

As another example, the instructions may also be executable to determine that the second device is currently being used by a user and, responsive to the determination that the second device is currently being used by the user, lock the hardware lock notwithstanding the second device being currently within the predetermined area.

Still further, in certain example embodiments the instructions may be executable to access first user identification (ID) data in local storage of the first device and determine whether second user ID data received via the one or more UWB signals from the second device matches the first user ID data. Responsive to the determination that the second device is within the predetermined area and based on the first and second user ID data matching, the instructions may be executable to unlock the hardware lock controlled by the first device.

Still further, in some examples the instructions may be executable to unlock the hardware lock controlled by the first device responsive to the determination and based on receipt of a software key to unlock the hardware lock. The software key may be received from the second device via the UWB transceiver.

In another aspect, a method includes tracking, using a first device, a location of a second device different from the first device using ultra-wideband (UWB) communication. The method also includes unlocking a physical lock controlled by the first device based on the tracking of the location of the second device.

In certain examples, the physical lock may provide access to the inside of a compartment in which a computer is houseable, where the computer may be different from the first device.

Still further, in some example implementations the method may include unlocking the physical lock based on the tracking of the location of the second device and based on receipt of login information to unlock the physical lock. The login information may be provided via one or more UWB signals from the second device used as part of the tracking.

Additionally, in some examples the method may include tracking, using the first device, the location of the second device using UWB communication to determine that the second device is within a predetermined area of the first device. Based on determining that the second device is within the predetermined area of the first device, the method may include unlocking the physical lock controlled by the first device.

In still another aspect, at least one computer readable storage medium (CRSM) that is not a transitory signal includes instructions executable by at least one processor to track a location of a first device relative to a second device using ultra-wideband (UWB) communication. The instructions are also executable to unlock a lock of the second device based on the tracking of the location of the first device, where the second device may include a compartment secured by the lock.

The lock may be a tangible lock on the second device that secures the compartment. Additionally, in some example implementations the instructions may be executable to unlock a software lock for the second device and unlock the tangible lock on the second device based on the tracking of the location of the first device.

Still further, in some example embodiments the instructions may be executable to track the location of the first device using UWB communication to determine that the first device is moving away from the second device. In these embodiments, the instructions may be executable to actuate a locking mechanism in the lock to place the lock in a locked configuration based on the determination that the first device is moving away from the second device.

Additionally, if desired the instructions may be executable to permit the second device to be powered down responsive to a determination that the first device is within a predetermined area of a particular side of the second device. The predetermined area may be an area in front of a power switch for the second device, where the power switch may be located on the particular side. The instructions may also be executable to deny a request to power down the second device responsive to a determination that the first device is not within the predetermined area of the particular side of the second device.

The details of present principles, both as to their structure and operation, can best be understood in reference to the accompanying drawings, in which like reference numerals refer to like parts, and in which:

DETAILED DESCRIPTION

Among other things, the detailed description below relates to an UWB-based smart hardware lock for a device. UWB-enabled devices such as smartphones with UWB transceivers may be used to not only validate that an authorized user is present in proximity to the locking device, but that the user is at a specific expected position such as at the keyboard for the locking device when activating the locking device and/or when providing a password for an additional software lock of the locking device. The locking device may also validate that the user is at another expected position such as the rear of the device near its power switch when attempting to deactivate the locking device. These things may be done based on use of UWB by the locking device to detect both direction and distance to the user's personal device such as their smartphone.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
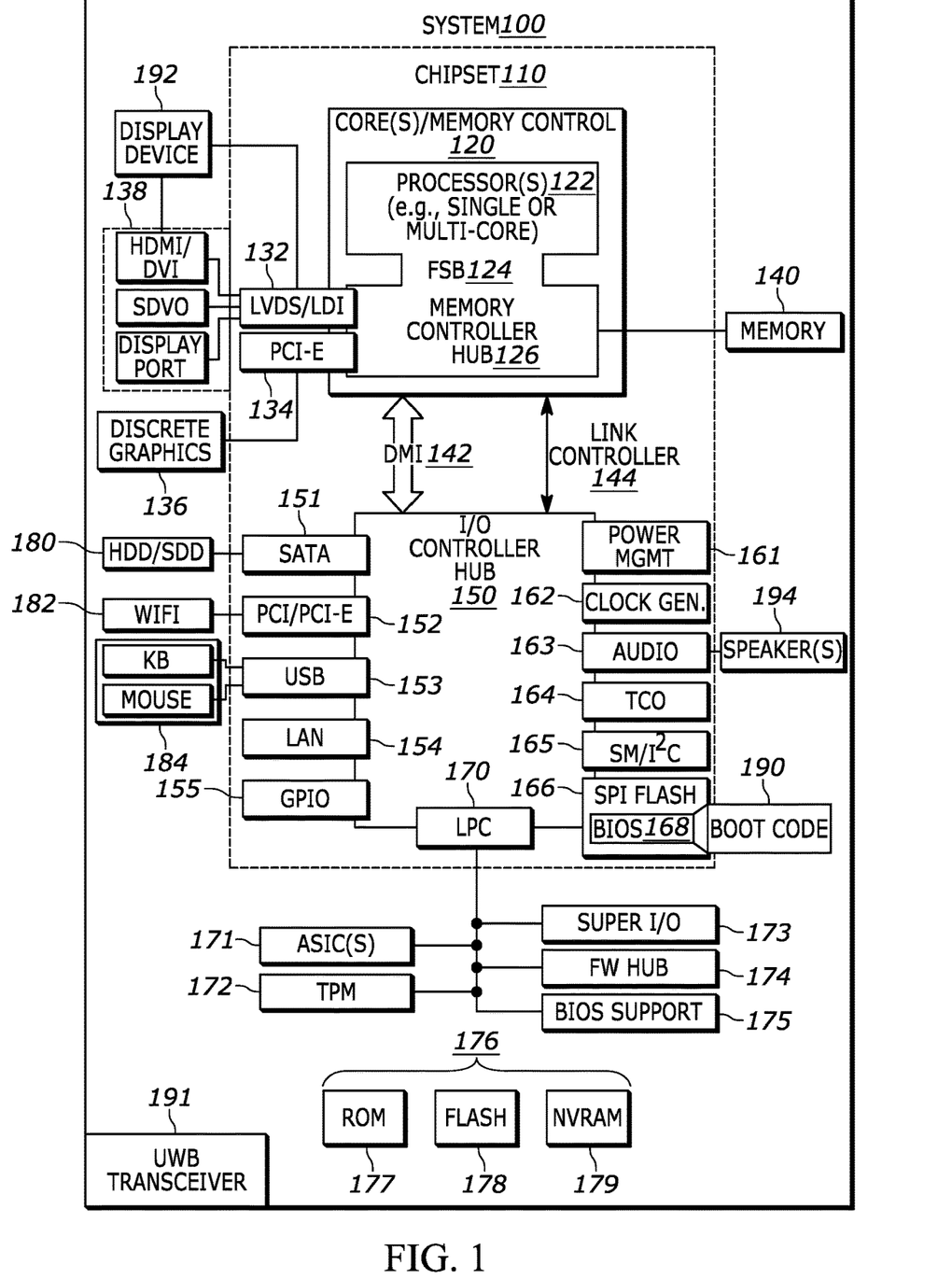
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include an ultra-wideband (UWB) transceiver 191 configured to transmit and receive data using UWB signals and UWB communication protocol(s), such as protocols set forth by the FiRa Consortium. As understood herein, UWB may use low energy, short-range, high-bandwidth pulse communication over a relatively large portion of the radio spectrum. Thus, for example, an ultra-wideband signal/pulse may be established by a radio signal with fractional bandwidth greater than 20% and/or a bandwidth greater than 500 MHz. UWB communication may occur by using multiple frequencies (e.g., concurrently) in the frequency range from 3.1 to 10.6 GHz in certain examples.

To transmit UWB signals consistent with present principles, the transceiver 191 itself may include one or more Vivaldi antennas and/or a MIMO (multiple-input and multiple-output) distributed antenna system, for example. It is to be further understood that various UWB algorithms, time difference of arrival (TDoA) algorithms, and/or angle of arrival (AoA) algorithms may be used for system 100 to determine the distance to and location of another UWB transceiver on another device that is in communication with the UWB transceiver on the system 100 to thus track the real-time location of the other device.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
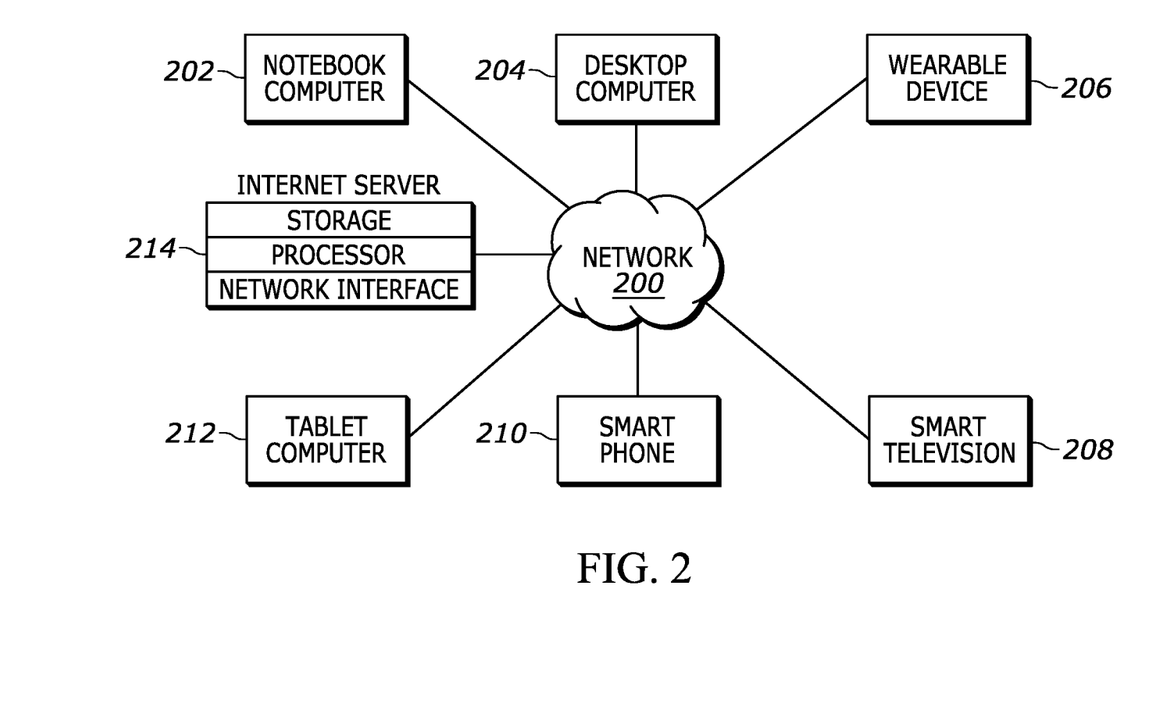
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 and/or UWB to undertake present principles.

Figure 3:
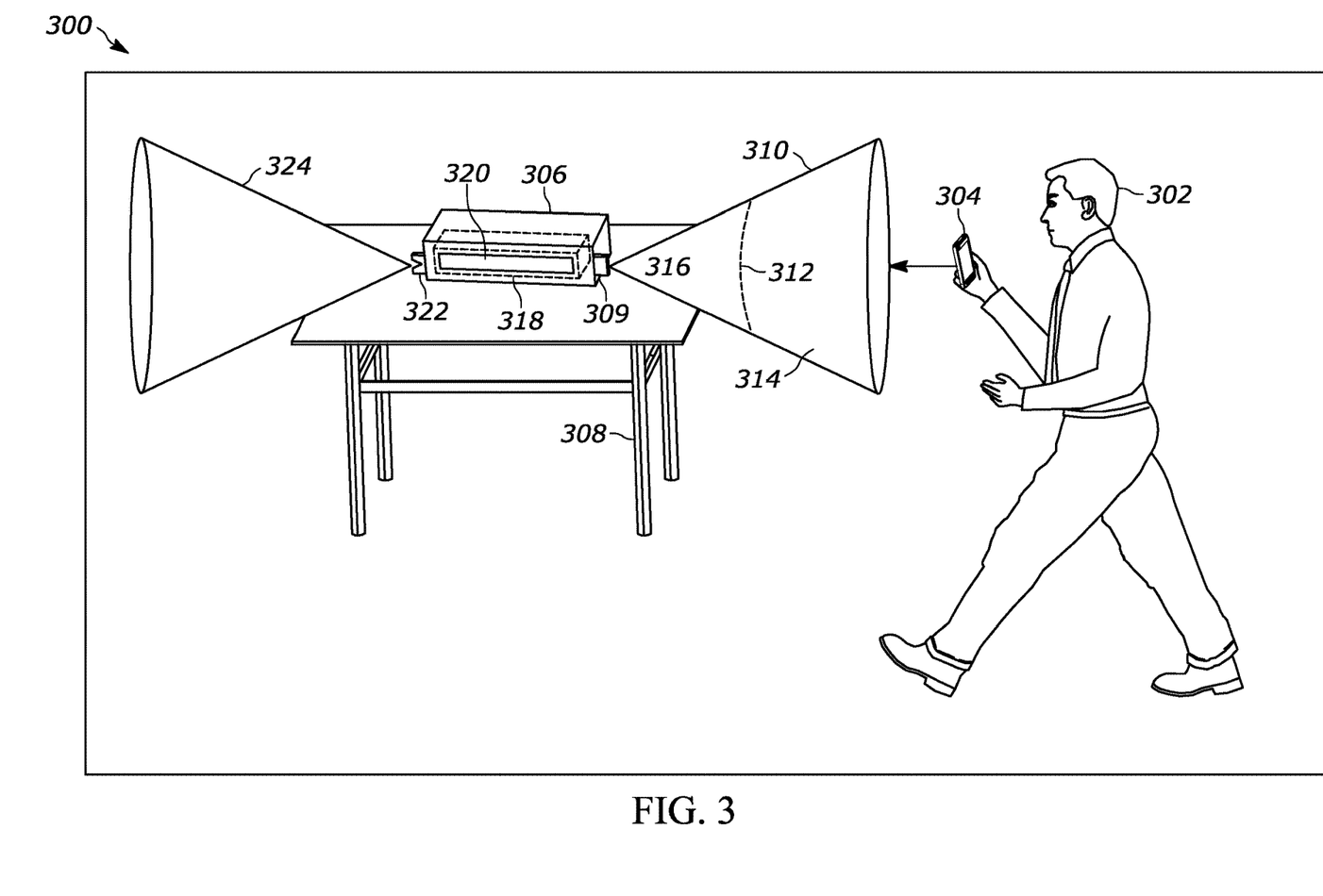
FIG. 3 is an example illustration of an end-user with a smartphone approaching another device with an inner compartment to unlock a hardware lock of the other device based on UWB location tracking consistent with present principles.

Now in reference to the example illustration 300 shown in FIG. 3, suppose an end-user 302 is holding his or her smartphone 304 in one hand while walking toward a device 306 that is sitting on a table 308 and has a hardware lock 309 such as a UWB-enabled smart door lock, deadbolt lock, barrel bolt lock, cam lock, or padlock. Based on UWB signals transmitted by the phone 304 to the device 306, a processor in the device 306 such as the device's central processing unit (CPU) or another processor may track the location of the phone 304 in real time using UWB as the phone 304 moves about the environment to determine whether to unlock the lock 309. However, also note that in some examples the phone 304 may track its own location with respect to the device 306 based on UWB signals transmitted between the two devices to then send a hardware unlock command to the device 306 responsive one or more conditions being met as set forth further below.

Thus, once the device 306 (or phone 304) determines that the phone 304 has entered a predetermined area 310 in front of the device 306, the device 306 may unlock the hardware lock 309 without a metallic, tangible key or other non-electronic method being used to unlock the lock 309. Note that the area 310 as illustrated may be virtual in that the user 302 would not be able to see the cone of the area 310 but the phone 304 entering the area 310 as tracked by the device 306 may still be a trigger for the device 306 to nonetheless unlock the hardware lock 309. The vertex of the cone for the area 310 may extend outward from a center point of the lock 309, for example, so that the area 310 does not include any area behind the device 306 as positioned on the table 308, with it being understood that the lock 309 is located on the front face of the device 306.

In this way, only when the user 302 approaches the device 306 from a particular direction relative to the front of the device 306 and enters the three-dimensional cone-shaped area 310 does the device 306 unlock its hardware lock 309. This may be helpful so that unintentional triggers are not provided for unlocking the lock 309, like if the user 302 were to be walking around the backside of the device 306 on another side of the table 308. Additionally, to further avoid false triggers, in some examples the device 306 may require that the phone 304 be located continuously in the area 310 for at least a threshold non-zero amount of time so that the phone 304 entering the area 310 for a mere moment does not trigger an unintentional unlocking of the hardware lock 309. To accomplish this, three seconds may be sufficient for the threshold amount of time, for example.

Also note that in addition to or in lieu of the smartphone 304 entering the area 310 to trigger the device 306 to unlock its hardware lock 309, still other conditions may be met to unlock the hardware lock 309. For example, again using UWB location tracking, the device 306 may track the real-time current location of the phone 304 to identify a motion vector from the smartphone 304 toward the device 306 that indicates motion of the phone 304 with respect to the front of the device 306 bearing the lock 309. Again, to avoid false triggers, the motion vector may need to satisfy a threshold to trigger the device 306 to unlock the lock 309, such as for example the motion vector indicating motion of the phone 304 toward the front vertical face of the device 306 bearing the lock 309 from a direction in front of the front face, such that the motion is orthogonal to the front face plus or minus fifteen degrees in the X and/or Y dimension.

Additionally, note that in some examples to further avoid false triggers, motion vector tracking may be combined with use of the area 310 so that both conditions would have to be met in order to trigger the unlocking of the lock 309. This might be helpful where, for example, the user 302 walks sideways in front of the device 306 while doing something else and the phone 304 temporarily enters the area 310, but the motion vector indicates motion parallel to the front face of the device 306 (or at least not orthogonal to the front face plus/minus fifteen degrees). Thus, a false trigger would be averted.

However, recognizing that there may still be instances where the user 302 may walk from a side direction toward the device 306 with the intention to unlock the lock 309, in some examples the cone of the area 310 may be divided as shown by line 312 so that satisfying both the motion vector condition and area condition may be required to trigger unlocking of the lock 309 for the outer frustoconical portion 314 of the area 310, but the device 304 entering the inner conical portion 316 of the area 310 regardless of motion vector may also still trigger unlocking of the lock 309.

As for the device 306 itself, note that it may be any number of different types of devices but, in certain examples, may be an electronic safe or other structure having metallic outer walls to prevent penetration of the walls as well as to prevent access to an inner compartment 318 of the device 306 save through a door on the front face that is lockable and unlockable via the lock 309. However, further note that there may still be USB ports, ethernet ports, power ports, and other ports on the outside of the device 306 that connect to respective ports on the inside of the device 306 to which another device 320 may couple from inside the compartment 318. The other device 320 might be, for example, an Internet of things (IoT) device, edge device (e.g., router/modem), smart cash register, personal computer, or server. The outer ports in turn may be coupled to other devices or components outside the device 306 via a respective USB connection, ethernet connection, a power outlet connection (via a power adapter connected to the outer power port), etc. In this way, with the lock 309 locking the door of the device 306 shut, the device 320 may remain both networked to the outside and secured within the device 306 until an authorized user has his/her phone with appropriate access permissions located within the area 310 to unlock the lock 309 and thus the door of the device 306 to gain access to the compartment and device 320.

Still in reference to FIG. 3, note further that an outer back side of the device 306 (e.g., vertical side opposite the outer front side that bears the lock 309) may bear an on/off hardware switch 322 that a person may flip on or off to respectively power on or power off/down the device 306, and/or to respectively power on or power off/down the device 320 inside. However, rather than simply allowing any person to control the power state of the devices 306 and/or 320 via the switch 322, consistent with present principles an authorized device (such as an authorized user's smartphone) may be required to be located within a separate predefined area 324 for a same or different threshold amount of time as the area 310.

Aside from the predetermined area 324 extending from an opposite side of the device 306 than the area 310, it may be similar in many other respects such as being virtual so that the user 302 would not be able to see the cone of the area 324 but the phone 304 entering the area 324 as tracked by the device 306 via UWB location tracking may still be a trigger for the device 306. However, here the trigger is to permit the device 306 and/or device 320 to be powered down via actuation of the switch 322. The vertex of the cone for the area 324 may extend from a center point of the switch 322, for example, so that the area 324 does not include any overlapping area as the area 310.

In this way, only when the user 302 approaches the device 306 from a particular direction relative to the back of the device 306 and enters the three-dimensional cone-shaped area 324 may the device 306 permit itself and/or the device 320 to be powered off or down via actuation of the switch 322 by an authorized user. This may be helpful so that only authorized users with UWB-enabled devices can power down the device 306 and/or 320, which might be important if the device 320 were used for security monitoring in a store or held access to secure information that is to be available to other devices more or less all the time.

Figure 4:
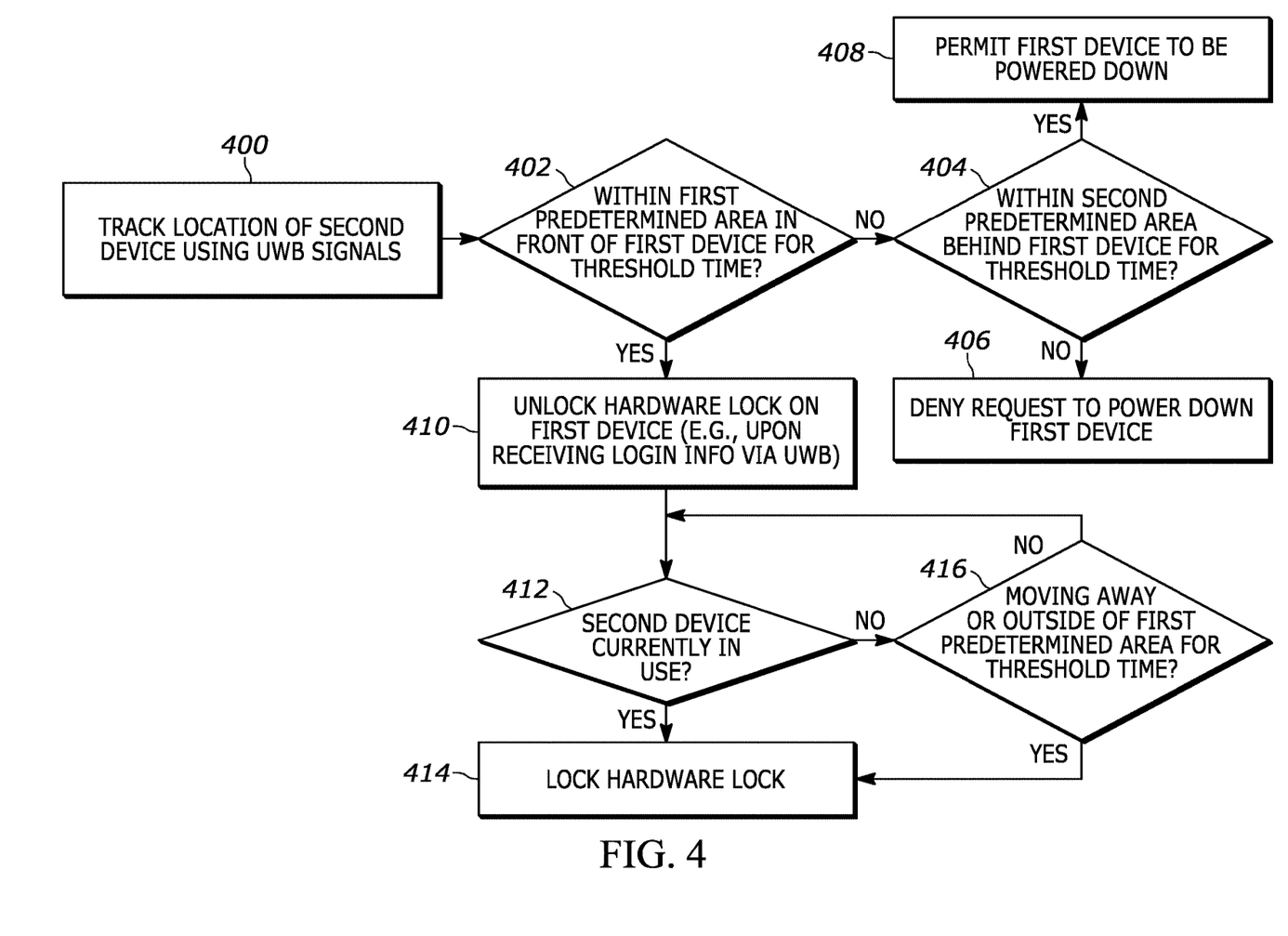
FIG. 4 illustrates example logic in example flow chart format that may be executed by a device performing UWB location tracking consistent with present principles.

Before moving on to FIG. 4, also note consistent with present principles that powering off a device is one example of a device being powered down. Other examples of powering down a device include placing the device in a sleep state or hibernate state.

Continuing the detailed description now in reference to FIG. 4, it shows example logic that may be executed by a first device such as the system 100 or device 306 consistent with present principles. Note that while the logic of FIG. 4 is shown in flow chart format, state logic or other suitable logic may also be used.

Beginning at block 400, the first device may track a location of a second device using UWB signals received in real time from the second device. The second device might be the smartphone 304 from the example above or another type of personal device such as a wearable smartwatch, tablet computer, electronic glasses, or augmented reality (AR) or virtual reality (VR) headset, etc.

The logic may then proceed to decision diamond 402 where the first device may determine whether the second device is within a predetermined area of the first device to unlock a hardware lock of the first device, such as the area 310 described above (e.g., for a threshold amount of time). An affirmative determination may cause the logic to proceed to block 410 as will be described shortly. However, first note that responsive to a negative determination at diamond 402, the logic may instead proceed to decision diamond 404.

At diamond 404 the first device may determine whether the second device is inside of another predetermined area of the first device within which an authorized user's personal device is to be in order to permit a power down of the first device or other device inside of it (e.g., the device 320). For example, the other predetermined area may be the area 324 from the example of FIG. 3 above. And here too the second device may in some examples be required to be within the area continuously for a threshold amount of time for an affirmative determination. Then responsive to an affirmative determination at diamond 404, the logic may proceed to block 408 where the first device may permit a user command to power down to be executed to in turn power down the first device itself. However, responsive to a negative determination at diamond 404, the logic may instead proceed to block 406 where the first device may deny the request to power down the first device and instead keep the first device powered on as it was prior to receipt of the user command (e.g., that might have been provided via a hardware power button or switch like the switch 322). Then from either of blocks 406 or 408, the logic may return to block 400 and proceed therefrom.

Now referring to the aforementioned block 410, which again may be arrived at responsive to an affirmative determination at diamond 402, at block 410 the first device may unlock a hardware lock on the first device, such as the lock 309 described above. The unlocking may be performed based on UWB location tracking simply indicating that the second device is within the corresponding predetermined area (e.g., area 310). Or the unlocking may be performed based on the second device not only being within the corresponding predetermined area but also transmitting valid login information that is received by the first device via the same or different UWB signals that were used for the location tracking itself in order to unlock an additional software lock for the first device that requires valid user authentication credentials. However, further note that in other examples the login information may be received via other wireless signals from the second device such as Bluetooth or Wi-Fi signals, if desired.

A copy of the login information itself may be stored in secure local storage of the second device, e.g., by system administrator that only gives certain users access to unlock the first device's lock via their respective personal devices. The login information may include user identification (ID) data such as a username or email address so that, at block 410, the first device may access another copy of user ID data in local storage of the first device and determine whether the received user ID data matches the local copy of the user ID data. The login information may also include a software key such as a password or numerical passcode or even randomized key like an encryption key so that, also at block 410, the first device may compare the received software key to corresponding software key data also stored locally to determine whether a match exists to thus authenticate the associated user. However, also note that in some examples the prestored user ID data and software key for comparison to the login information received from the second device may also be stored remotely in secure cloud storage, if desired.

In any case, based on the login information received via UWB or other wireless signals from the second device matching the pre-stored login information, the first device may electronically control its hardware lock, e.g., by physically actuating at least one element within the hardware lock to unlock the hardware lock. For example, the first device may control an inner locking mechanism like pins in the lock's cylinder by actuating a motor inside the lock to place the pins in an unlocked configuration so that latch or bolt may be moved by the user to open the first device's door to reach its inner compartment. Or in some examples, the first device may also actuate the latch or bolt itself via a motor so that the door pops open automatically.

Still in reference to FIG. 4, from block 410 the logic may proceed to decision diamond 412. At diamond 412 the first device may determine whether the second device itself is currently in use by the user (e.g., for at least a threshold amount of time such as five seconds to avoid false triggers). Whether the second device is currently in use may be determined based on paired Bluetooth or other communication between the two devices, for example. Or the second device may transmit, via UWB signals or other wireless signals, its current processes and/or device status to the first device.

The second device currently being in use may include providing touch input to the display of the second device, the second device presenting audio visual content like an Internet video streamed to the second device, the second device's camera being currently in use, etc. Responsive to an affirmative determination at diamond 412, the logic may proceed to block 414 where the first device may close its door protected by the lock (e.g., using a motor if the door is not already closed) and lock its hardware lock with the door closed to thus secure the compartment inside the first device (that again might house a separate computer or server). The first device may do so at block 414 notwithstanding the second device being currently within the predetermined area for unlocking the hardware lock in order to secure the inner compartment of the first device while the user's attention is diverted elsewhere (to the second device in active use). Then once the display of the second device is powered off or the user otherwise stops using the second device, the first device may again unlock its hardware lock (assuming the second device is still within the predetermined area in front of the hardware lock, for example).

However, referring back to diamond 412, if a negative determination is made rather than an affirmative one, the logic may instead proceed to decision diamond 416. At diamond 416 the first device may determine, based on UWB location tracking, whether the second device is now outside of the predetermined area for unlocking the hardware lock (e.g., for at least a threshold amount of time such as five seconds, to avoid false triggers again). Additionally, or alternatively, at diamond 416 the first device may determine whether a motion vector for the second device identified via UWB location tracking indicates motion away from the first device (e.g., in any direction), or motion away from the first device so long as not also within the inner conical portion 316 described above.

Responsive to a negative determination at diamond 416, the logic may revert back to diamond 412 and proceed therefrom. However, responsive to an affirmative determination at diamond 416, the logic may instead proceed to block 414 as described above so that the first device may lock its hardware lock.

Figure 5:
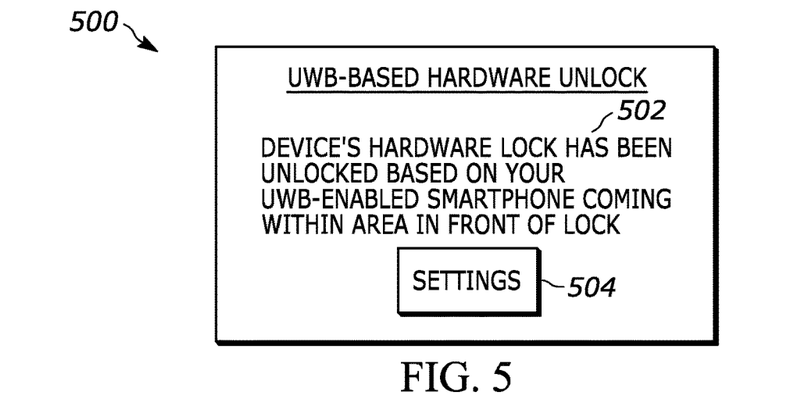
FIGS. 5 and 7 show example graphical user interfaces (GUIs) that may be presented at various times based on UWB location tracking consistent with present principles.

Now in reference to FIG. 5, a graphical user interface (GUI) 500 is shown that may be presented on a display of the first device of FIG. 4 based on the first device unlocking its hardware lock based on UWB location tracking as set forth herein. As shown, the GUI 500 may include a prompt 502 indicating that the first device has unlocked its hardware lock based on a paired smartphone coming within a predetermined area in front of the first device. The GUI 500 may also include a selector 504 which may be selectable to command the first device to present another GUI from which one or more settings related to UWB location tracking for unlocking the hardware lock may be configured. An example of such a settings GUI is shown in FIG. 6.

Figure 6:
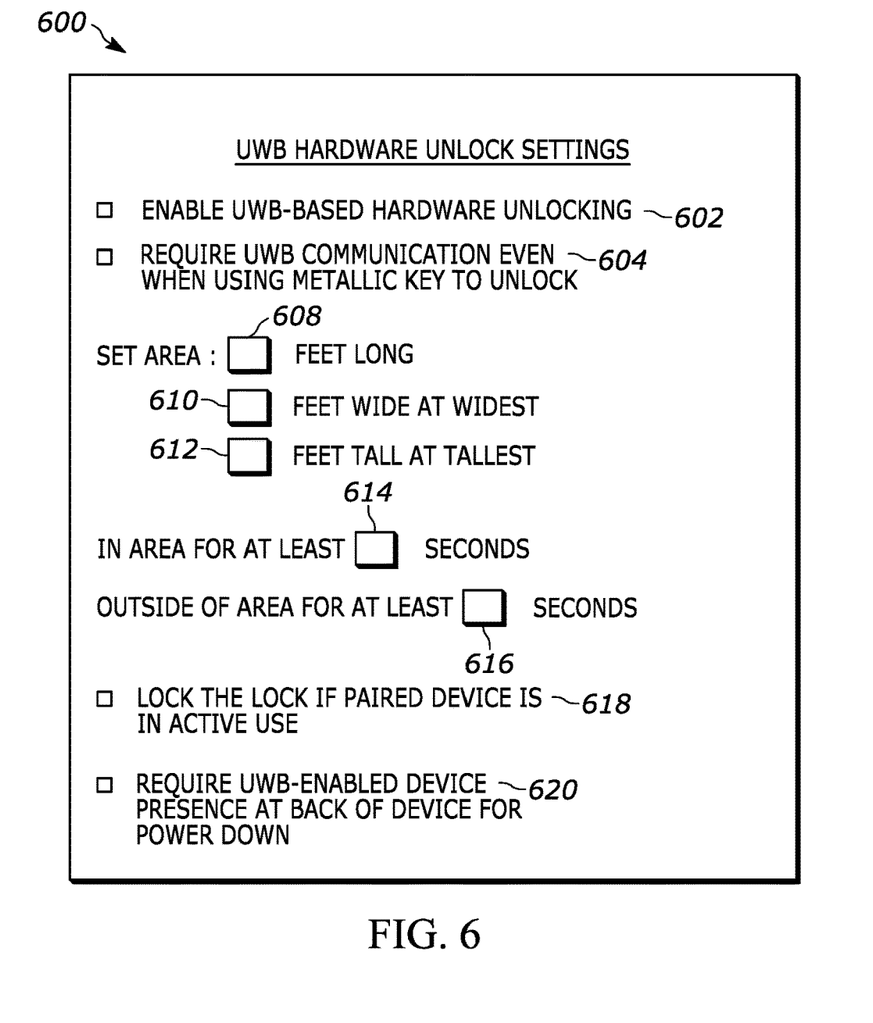
FIG. 6 shows an example GUI that may be presented to configure one or more settings of a device to operate consistent with present principles.

Accordingly, reference is now made to the GUI 600 of FIG. 6. Note that each of the options to be discussed below may be selected by directing touch or cursor input to the respective check box adjacent to the respective option.

As shown in FIG. 6, the GUI 600 may include a first option 602 that may be selectable to set or configure the first device to, in the future, perform UWB location tracking of other devices to determine whether to unlock the first device's hardware lock and/or permit execution of a power down command consistent with present principles. For example, the option 602 may be selected to enable the device to execute the logic of FIG. 4 and/or present the GUI 500 of FIG. 5 or GUI 700 of FIG. 7 that will be described later.

If desired, in some examples an option 604 may be presented on the GUI 600. The option 604 may be selected to set or enable the first device of FIG. 4 to require an authorized personal device to be located within the predetermined area for unlocking the first device's hardware lock even when a metallic key is inserted into the lock's keyhole and turned to unlock the lock manually. Thus, option 604 may be selected to establish an even higher degree of security for accessing the first device's inner compartment to prevent unauthorized access to the compartment by a person who might have gained access to the metallic key but still does not possess a personal device that has been set with the appropriate access permissions.

As also shown in FIG. 6, the GUI 600 may also include respective input boxes 608, 610, 612 at which the user may respectively enter respective numbers to establish the dimensions of one or both of the cones of the predetermined areas 310, 324 as discussed above in relation to FIG. 3. As shown in FIG. 6, box 608 may be used to enter a number of feet for the first device to use for the length of the cone(s), while box 610 may be used to enter a number of feet to use for the width of the cone(s) at their widest (e.g., at the respective cone's base or circular plane surface). Likewise, box 612 may be used to enter a number of feet for the first device to use for the height of the cone(s) (e.g., again at the respective cone's base or circular plane surface). Thus, note that the cone(s) need not be symmetric in all examples, and further note that in some examples a predetermined area need not be cone-shaped at all. For example, the predetermined areas may simply be boxes of a predetermined height, width, and length in front of and behind the first device. Still further, note that while dimensions may be specified in feet according to the GUI 600, other increments may also be used such as meters or centimeters.

Still in reference to FIG. 6, in some examples an input box 614 may be presented on the GUI 600. The user may input a number into the box 614 in order to establish a threshold time during which another device in UWB communication with the first device is to be within the first device's predetermined area(s) before the first device unlocks its hardware lock and/or permits execution of a power down command. If desired, the GUI 600 may also include another input box 616 for the user to enter another number to establish a different threshold time after the other device leaves the predetermined area(s) for the first device to lock its hardware lock and/or disallow a power down command from being executed.

Additionally, in some examples the GUI 600 may include an option 618 that may be selected to set or enable the first device to lock its hardware lock if another device paired or communicating with it is in active use. For example, the option 618 may be selected to set or configure the first device to specifically execute diamond 412 and block 414 as described above.

The GUI 600 may also include an option 620. The option 620 may be selected to specifically set or enable the first device to require another device to be within the predetermined area at the back of the first device for the first device to permit execution of a power down command. For example, the option 620 may be selected to set or configure the first device to specifically execute steps 404-408 of FIG. 4.

Figure 7:
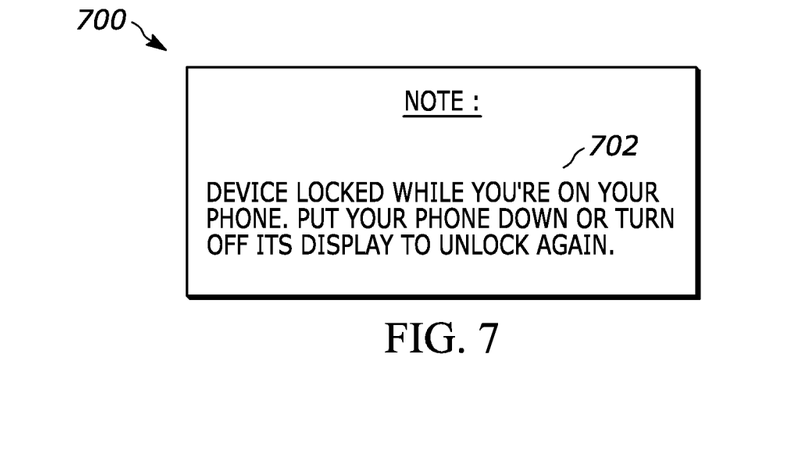

Now in reference to FIG. 7, it shows another example GUI 700 that may be presented on the display of the first device of FIG. 4 consistent with present principles. The GUI 700 may be presented on the first device's display responsive to a determination that another device paired with the first device is actively in use as set forth above. As a result, per this example the first device has locked its hardware lock. Accordingly, as shown the GUI 700 may include a prompt 702 indicating that the first device has locked its hardware lock since the first device has identified another device paired with it (in this case, a smartphone) as being currently in use. The prompt 702 may also include instructions to put the other device down on a surface or turn off its display for the first device to unlock its hardware lock again. Note that determining whether the other device has been put down on a surface may be based on orientation data transmitted wirelessly to the first device, as generated at the second device using its gyroscope or other orientation sensor. Orientation of the other device may also be determined based on UWB location tracking itself as the first device might determine based on the angle of arrival of UWB signals from the other device and the known location of UWB transceiver on the other device.

Figure 8:
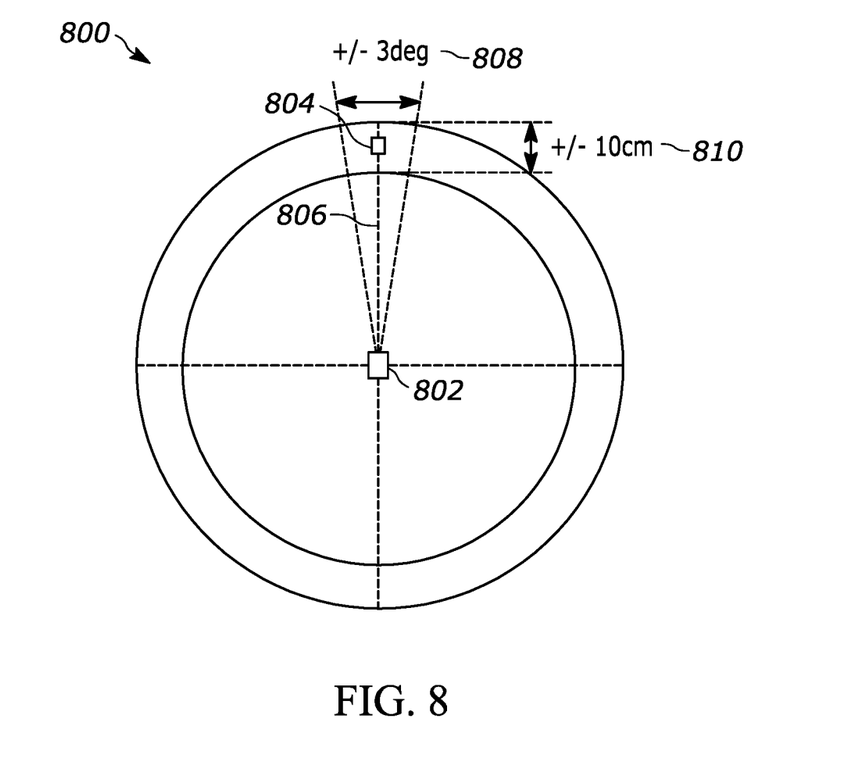
FIG. 8 shows an example illustration of UWB location accuracy consistent with present principles.

Continuing the detailed description in reference to FIG. 8, it shows an example illustration 800 of UWB location accuracy. As shown, a first device 802 that might be executing the logic of FIG. 4 may determine a bearing 806 to a second device 804 using UWB signal exchange, which may be accurate to plus/minus three degrees 808 or even less. Depth (distance) between the first device 802 and second device 804 may also be determined using UWB to plus/minus ten centimeters 810 or even less. Thus, the device 802 may determine the location of the device 804 relative to the device 802 with relatively high accuracy. So, for example, the device 802 may determine whether the second device 804 comes within a predetermined area as set forth above to determine whether the first device should unlock its hardware lock consistent with present principles.

Moving on from FIG. 9, it is to be further understood that UWB-based unlocking of a given device's hardware lock and the permitting a power down command may be performed for multiple different end-users with various levels of permissions. For instance, suppose a first user and a second user each have their own smartphone for UWB location tracking and may report, via UWB signals, a device identification (ID) and/or login information for their respective smartphone so that the first device of FIG. 4 may track the different devices by device/user ID.

In accordance with this example, different rules or rule sets may be implemented for each user. For example, one user might have administrator privileges for the first device and so when his/her respective smartphone is detected via UWB as being within a respective predetermined area, the first device may unlock its hardware lock or permit a power down command to be executed. However, the second user may have lesser privileges, where the second user's smartphone may be permitted to unlock the hardware lock when within that respective predetermined area but is still not permitted to power down the first device even if his/her smartphone is within the respective predetermined area for power down.

It may now be appreciated that present principles provide for an improved computer-based user interface that increases the functionality, accuracy, and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A first device, comprising:
   at least one processor;
   an ultra-wideband (UWB) transceiver accessible to the at least one processor; and
   storage accessible to the at least one processor and comprising instructions executable by the at least one processor to:
   track a location of a second device different from the first device using one or more UWB signals received from the second device via the UWB transceiver;
   based on at least one additional user action at the second device and responsive to a determination, based on the tracking of the location of the second device, that the second device is within a predetermined area of the first device, unlock a hardware lock controlled by the first device, wherein the at least one additional user action comprises powering off a display of the second device.

2. The first device of claim 1, wherein the instructions are executable to:
   present a graphical user interface (GUI), the GUI comprising a prompt indicating that the hardware lock has been unlocked, the GUI comprising data identifying the second device.

3. The first device of claim 1, wherein the instructions are executable to:
   present a graphical user interface (GUI), the GUI comprising a prompt indicating that the hardware lock has been unlocked, the prompt specifying that the hardware lock has been unlocked based on the second device coming within the predetermined area of the first device.

4. The first device of claim 1, comprising the second device.

5. The first device of claim 1, wherein the instructions are executable to:
   responsive to the determination and also based on receiving a hardware key into the hardware lock, unlock the hardware lock controlled by the first device.

6. The first device of claim 1, wherein the at least one additional user action comprises putting the second device down on a surface.

7. The first device of claim 1, wherein the instructions are executable to:
   present a settings graphical user interface (GUI), the settings GUI comprising a first option that is selectable to enable unlocking of the hardware lock based on UWB location tracking of the second device.

8. The first device of claim 1, wherein the instructions are executable to:
   present a graphical user interface (GUI), the GUI comprising a prompt instructing a user to power off the display of the second device to unlock the hardware lock.

9. A method, comprising:
   tracking, using a first device, a location of a second device different from the first device using ultra-wideband (UWB) communication;
   based on at least one additional user action at the second device and based on the tracking of the location of the second device, unlocking a physical lock controlled by the first device, wherein the at least one additional user action comprises powering off a display of the second device.

10. The method of claim 9, wherein the physical lock is controllable one or more of: electronically, mechanically.

11. The method of claim 9, comprising:
    presenting a settings graphical user interface (GUI), the settings GUI comprising a first option that is selectable to enable unlocking of the physical lock based on UWB location tracking of the second device.

12. The method of claim 9, comprising:
    presenting a graphical user interface (GUI), the GUI comprising a prompt indicating that the physical lock has been unlocked.

13. The method of claim 9, wherein the at least one additional user action comprises putting the second device down on a surface.

14. The method of claim 9, comprising:
    presenting a graphical user interface (GUI), the GUI comprising a prompt instructing a user to power off the display of the second device to unlock the physical lock.

15. At least one computer readable storage medium (CRSM) that is not a transitory signal, the computer readable storage medium comprising instructions executable by at least one processor to:
    track a location of a first device relative to a second device using ultra-wideband (UWB) communication; and
    based on the tracking of the location of the first device and based on at least one additional user action at the first device, unlock a lock of the second device, wherein the at least one additional user action comprises powering off a display of the first device.

16. The CRSM of claim 15, wherein the at least one additional user action comprises putting the first device down on a surface.

17. The CRSM of claim 15, wherein the instructions are executable to:
    present a graphical user interface (GUI), the GUI comprising a prompt indicating that the lock has been unlocked.

18. The CRSM of claim 15, wherein the instructions are executable to:
    based on the tracking, based on the at least one additional user action, and also based on receiving a hardware key into the lock, unlock the lock of the second device.

19. The CRSM of claim 15, wherein the instructions are executable to:
    present a settings graphical user interface (GUI), the settings GUI comprising a first option that is selectable to enable unlocking of the lock based on UWB location tracking of the first device.

20. The CRSM of claim 15, wherein the instructions are executable to:
    present a graphical user interface (GUI), the GUI comprising a prompt instructing a user to power off the display of the first device to unlock the lock.

* * * * *